(12) United States Patent
Loewen et al.

(10) Patent No.: US 9,455,052 B2
(45) Date of Patent: Sep. 27, 2016

(54) FUEL BUNDLE FOR A LIQUID METAL COOLED NUCLEAR REACTOR

(75) Inventors: Eric P. Loewen, Wilmington, NC (US); Brian S. Triplett, Wilmington, NC (US); Brett J. Dooies, Wilmington, NC (US); Scott L. Pfeffer, Wilmington, NC (US)

(73) Assignee: GE-HITACHI NUCLEAR ENERGY AMERICAS LLC, Wilmington, NC (US)

( * ) Notice: Subject to any disclaimer, the term of this patent is extended or adjusted under 35 U.S.C. 154(b) by 1095 days.

(21) Appl. No.: 13/471,806

(22) Filed: May 15, 2012

(65) Prior Publication Data

US 2013/0308742 A1 Nov. 21, 2013

(51) Int. Cl.
| | |
|---|---|
| *G21C 3/32* | (2006.01) |
| *G21C 1/03* | (2006.01) |
| *G21C 3/322* | (2006.01) |
| *G21C 3/33* | (2006.01) |

(52) U.S. Cl.
CPC .............. *G21C 1/03* (2013.01); *G21C 3/322* (2013.01); *G21C 3/3305* (2013.01); *Y02E 30/34* (2013.01); *Y02E 30/35* (2013.01); *Y02E 30/38* (2013.01)

(58) Field of Classification Search
CPC ...... G21C 3/32; G21C 3/3206; G21C 3/322; G21C 2003/3432
See application file for complete search history.

(56) References Cited

U.S. PATENT DOCUMENTS

| | | | |
|---|---|---|---|
| 3,378,452 A | 4/1968 | Costes | |
| 4,005,521 A | 2/1977 | Kaplan et al. | |
| 4,692,302 A | 9/1987 | DeMario et al. | |
| 4,698,204 A | 10/1987 | Taleyarkhan | |
| 5,371,768 A * | 12/1994 | Matzner | G21C 3/322 376/439 |

FOREIGN PATENT DOCUMENTS

| | | |
|---|---|---|
| CN | 1258080 A | 6/2000 |
| CN | 1767076 A | 5/2006 |

(Continued)

OTHER PUBLICATIONS

Fanning, T. H. et al., "Multi-Resolution Modeling of Subassembly Pin Bundles for Advanced Fast Reactor Safety Simulations", International Conference on Mathmatics, Computational Methods & Reactor Physics (M&C 2009), Saratoga Springs, New York, May 3-7, 2009.

(Continued)

*Primary Examiner* — Marshall O'Connor
(74) *Attorney, Agent, or Firm* — Harness, Dickey & Pierce, P.L.C.

(57) ABSTRACT

In one embodiment, a fuel bundle for a liquid metal cooled reactor includes a channel, a nose assembly secured to a lower end of the channel, a plurality of fuel rods disposed within the channel, and an internal mixer disposed within the channel above the plurality of fuel rods. The internal mixer includes peripheral flow control members and interior flow control members. The peripheral flow control members are located near walls of the channel, and the interior flow control members are located towards a longitudinal center of the housing. At least one of the peripheral flow control members is configured to direct liquid metal flowing through the channel towards an interior of the channel, and at least one of the interior flow control members is configured to direct liquid metal flowing through the channel away from the interior of the channel.

17 Claims, 6 Drawing Sheets

(56) References Cited

FOREIGN PATENT DOCUMENTS

| | | | |
|---|---|---|---|
| GB | 1361700 A | | 7/1974 |
| JP | S5444187 | * | 4/1979 ............... G21C 3/32 |
| JP | S5444187 A | | 4/1979 |
| JP | H05157869 A | | 6/1993 |
| WO | 2012025589 A1 | | 3/2012 |

OTHER PUBLICATIONS

Hu, Rui and Fanning, T. H., "Intermediate-Resolution Method for Thermal-Hydraulics Modeling of a Wire-Wrapped Pin Bundle", Young Professional Thermal Hydraulics Research Competition-I, pp. 1003-1005.

Pointer, W. D. et al., "RANS-Based CFD Simulations of Sodium Fast Reactor Wire-Wrapped Pin Bundles", International Conference on Mathmatics, Computational Methods & Reactor Physics (M&C 2009), Saratoga Springs, New York, May 3-7, 2009.

PCT Search Report issued in connection with corresponding WO Patent Application No. US2013/035542 dated on Oct. 28, 2013.

Unofficial English translation of Office Action issued in connection with corresponding CN Application No. 201380031393.6 on Jan. 12, 2016.

* cited by examiner

FUEL BUNDLE FOR A LIQUID METAL COOLED NUCLEAR REACTOR

BACKGROUND OF THE INVENTION

1. Field of the Invention

Example embodiments relate generally to liquid metal cooled nuclear reactors, and more particularly, to a fuel bundle for a liquid cooled nuclear reactor.

2. Related Art

Liquid metal cooled nuclear reactors such as sodium cooled fast reactors may suffer from thermal striping. Thermal striping occurs when hot and cold spots develop in the sodium flow within and exiting the fuel bundles. These hot and cold spots cause thermal stresses in the upper part of the primary vessel that can be damaging over time.

SUMMARY OF INVENTION

In one embodiment, a fuel bundle for a liquid metal cooled reactor includes a channel, a nose assembly secured to a lower end of the channel, a plurality of fuel rods disposed within the channel, and an internal mixer disposed within the channel above the plurality of fuel rods. The internal mixer includes peripheral flow control members and interior flow control members. The peripheral flow control members are located near walls of the channel, and the interior flow control members are located towards a longitudinal center of the housing. At least one of the peripheral flow control members is configured to direct liquid metal flowing through the channel towards an interior of the channel, and at least one of the interior flow control members is configured to direct liquid metal flowing through the channel away from the interior of the channel.

In another embodiment, a fuel bundle for a liquid metal cooled reactor includes a channel, a nose assembly secured to a lower end of the channel, a plurality of fuel rods disposed within the channel, and an exterior mixer disposed on a top end of the fuel bundle where the liquid metal flowing through the fuel bundle exits. The exterior mixer including external flow control members, and at least one of the external flow control members is configured to direct the liquid metal exiting the fuel bundle away from the fuel bundle.

BRIEF DESCRIPTION OF THE DRAWINGS

The above and other features and advantages of example embodiments will become more apparent by describing in detail, example embodiments with reference to the attached drawings. The accompanying drawings are intended to depict example embodiments and should not be interpreted to limit the intended scope of the claims. The accompanying drawings are not to be considered as drawn to scale unless explicitly noted.

DETAILED DESCRIPTION

Figure 1:
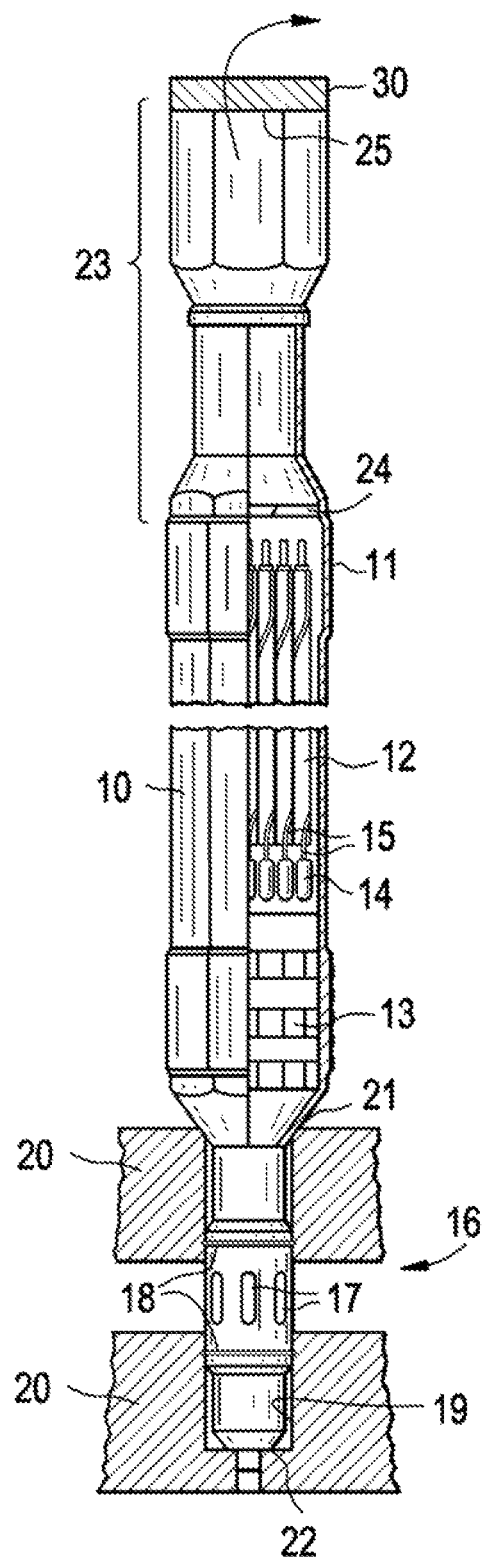
FIG. 1 illustrates a fuel bundle for a liquid metal cooled nuclear reactor according to an example embodiment.

Detailed example embodiments are disclosed herein. However, specific structural and functional details disclosed herein are merely representative for purposes of describing example embodiments. Example embodiments may, however, be embodied in many alternate forms and should not be construed as limited to only the embodiments set forth herein.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives falling within the scope of example embodiments. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

The fuel bundle or assembly is the major heat generating component of the reactor core in a nuclear power plant. The fuel bundle design in a liquid metal cooled reactor such as a liquid metal fast breeder reactor produces energy by means of a high integrity assembly of fissionable material that can be arranged in a critical array in the reactor core and can be readily cooled by liquid metal such as sodium at the reactor design conditions.

FIG. 1 illustrates a fuel bundle for a liquid metal cooled nuclear reactor according to an example embodiment. In particular, the fuel bundle of FIG. 1 will be described with respect to a sodium cooled nuclear reactor. As shown, the fuel bundle includes a hexagonal channel or casing 10 having a plurality of lateral load pads 11 on the upper external surface and containing therein a plurality of fuel rods 12 in the upper region and an orifice/shield section 13 in the lower region. The fuel rods 12 are secured at the lower ends thereof in a fuel rod support 14 and have spacer wires 15 wrapped therearound to space the fuel rods 12 from adjacent rods and the interior surface of channel 10. The lateral load pads 11 function to space the fuel assemblies in the reactor core to allow for fuel assembly insertion and distortion, and minimize friction due to surface contact in sodium coolant. A nose subassembly 16 is secured to the lower end of channel 10 and includes a plurality of sodium inlets 17 for directing sodium coolant into channel 10 and having seals 18 on opposite ends of inlets 17 for preventing leakage of the sodium between the nose subassembly 16 and an opening 19 in associated support structure 20 within which subassembly 16 is located. Fuel assembly support points on structure 20 are indicated at 21 and 22. A top end subassembly 23 is secured to the upper end of channel 10, with the sodium coolant having passed upwardly around fuel rods 12, passing through an internal mixer 24 in the upper end of channel 10 and exhausting through an outlet indicated at 25 in the top end subassembly 23. Additionally, an external mixer 30 is attached to the top end assembly 23. The internal mixer 24 and the external mixer 30 will be described in detail below.

Each fuel rod 12 is a long, hollow, stainless steel or stainless type alloy (e.g., HT9) tube with a central region containing, for example, plutonium-uranium metal fuel slugs bordered above and below by a region of uranium axial blanket pellets, and can, of course, be used in a radial blanket arrangement. It will be understood, that many variations of fuel exist and the embodiments are not limited to this example. A welded stainless steel plug seals the tube at the bottom. The region above the upper blanket contains a fission gas plenum section and a fuel column hold-down device and is sealed at the top by a similar plug. The duct channel assembly (components 10, 16 and 23) is constructed of stainless steel or stainless-type alloy and thus compatible with the liquid sodium coolant. The spacer wires are constructed of material such as 304 SS, 316 SS, and PE-16.

Figure 2:
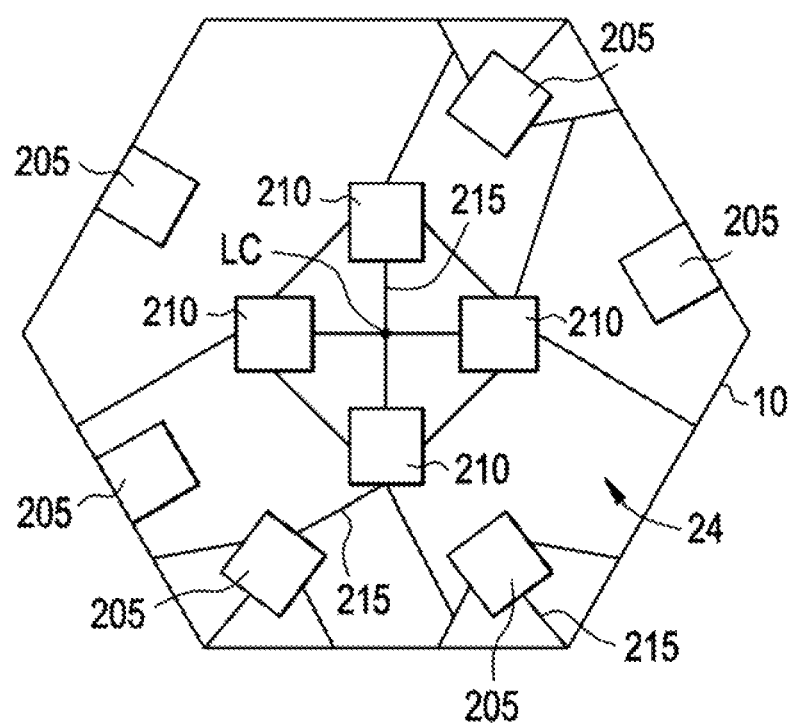
FIG. 2 illustrates a top down view of one example embodiment of the internal mixer in the fuel bundle of FIG. 1.

FIG. 2 illustrates a top down view of one example embodiment of the internal mixer 24. As shown, the internal mixer 24 includes peripheral flow control members 205 located near or attached to walls of the channel 10. The internal mixer 24 further includes interior flow control members 210 located nearer to a longitudinal center LC of the channel 10 than the peripheral flow control members 205. The interior flow control members 210 may be supported by a lattice support 215 that inter-connects flow control members 205 and 210, and anchors to walls of the channel 10. As shown in FIG. 2, the peripheral flow control members 205 may be mounted directly to a wall of the channel 10, or supported by the lattice support 215.

The peripheral flow control members 205 may be arranged in a uniform or patterned manner, or as shown in FIG. 2 may be arranged randomly. The interior flow control members 210 may be arranged in a uniform or patterned manner, or as shown in FIG. 2 may be arranged randomly.

The peripheral and interior flow control members 205 and 210, and the lattice support 215 may be formed from stainless steel and thus compatible with the liquid sodium coolant.

Figure 3A:
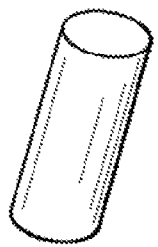
FIGS. 3A-3C illustrate different embodiments of flow control members.
Figure 3B:
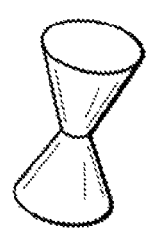
Figure 3C:
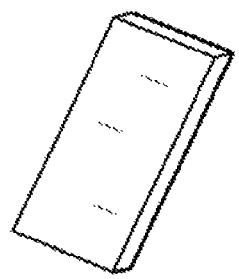

The peripheral and interior flow control members 205 and 210 may be tubes as shown in FIG. 3A, nozzles as shown in FIG. 3B, vanes as shown in FIG. 3C, etc. The orientation of the peripheral and interior flow control members 205 and 210 determines the affect the peripheral and interior flow control members 205 and 210 have on the liquid metal coolant flowing through the internal mixer 24. In one embodiment, at least one or more of the peripheral flow control members 205 is oriented to direct the liquid metal coolant towards an interior of the channel 10 (e.g., towards a longitudinal center of the channel 10). In this or another embodiment, at least one or more of the interior flow control members 210 is oriented to direct the liquid metal coolant away from the longitudinal center of the channel 10 (e.g., towards walls of the channel 10).

For example, in one embodiment, one or more of the peripheral flow control members 205 is angled towards the longitudinal center LC of the channel 10 with respect to the flow of liquid metal coolant. The angle may be between 5-60 degrees, but is not limited to this range. Similarly, in one embodiment, one or more of the interior flow control members 210 is angled away the longitudinal center LC of the channel 10 with respect to the flow of liquid metal coolant. The angle may be between 5-60 degrees, but is not limited to this range.

In another embodiment, the internal mixer 24 may include a frame having a shape that matches the inner periphery of the channel 24. The peripheral flow control members 205 and the lattice support 215 may be connected to the frame instead of the walls of the channel 10. And, the frame may be connected to the walls of the channel 10.

Figure 4:
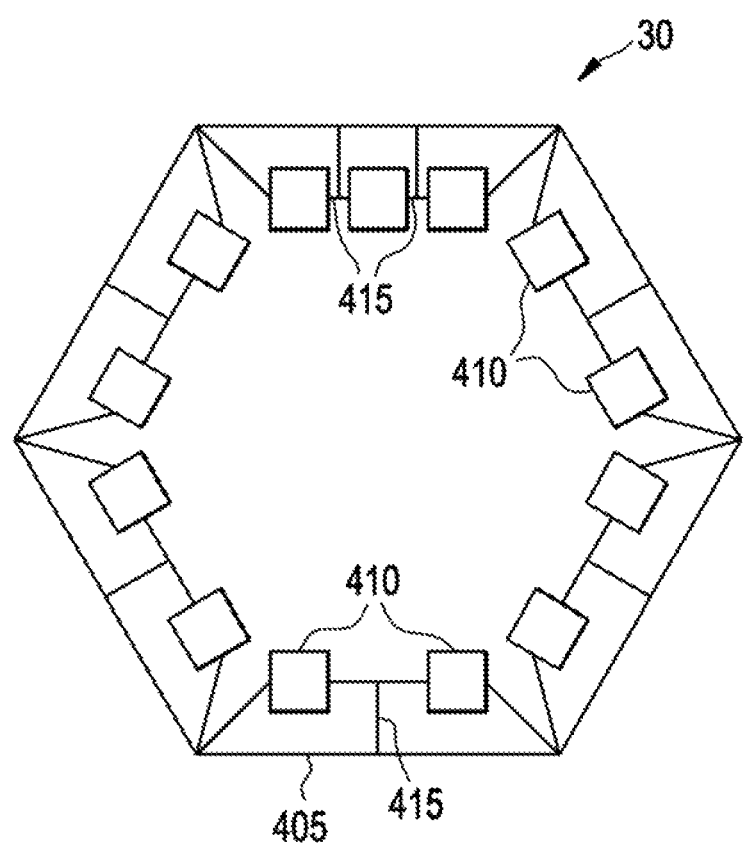
FIG. 4 illustrates a top down view of an example embodiment of the external mixer in the fuel bundle of FIG. 1.

FIG. 4 illustrates a top down view of an example embodiment of the external mixer 30. As shown, the external mixer 30 has a frame 405. The frame 405 has a same general shape as the channel 10, and is configured to seat on and be attached to the top end of the channel 10 as shown in FIG. 1. A support lattice 415 is connected to the frame 405 and supports external flow control members 410. At least one of the external flow control members 410 is configured to direct the liquid metal exiting the fuel bundle away from the fuel bundle (e.g., towards a space above another fuel bundle). For example, the external flow control members 410 may be tubes as shown in FIG. 3A, nozzles as shown in FIG. 3B, vanes as shown in FIG. 3C, etc. The orientation of the external flow control members 410 determines the affect the external flow control members 410 have on the liquid metal coolant flowing through the internal mixer 24. For example, in one embodiment, one or more of the external flow control members 410 is angled away from the longitudinal center LC of the channel 10 with respect to the flow of liquid metal coolant. The angle may be between 5-60 degrees, but is not limited to this range. The frame 405, the external flow control members 410, and the lattice support 415 may be formed from stainless steel and thus compatible with the liquid sodium coolant.

Figure 5:
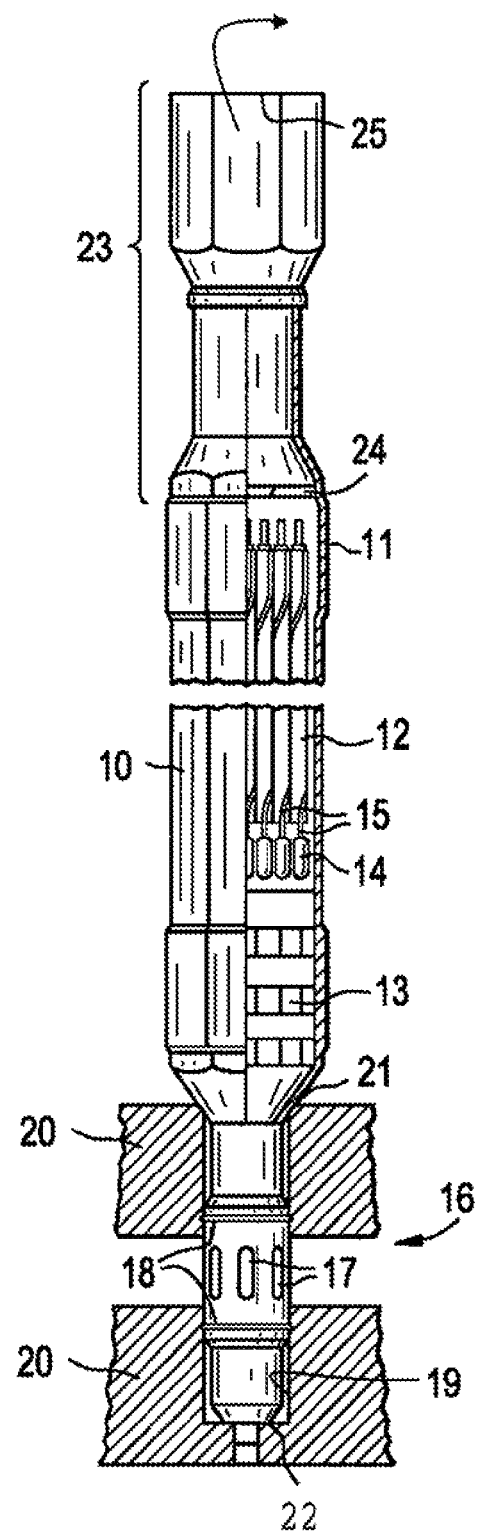
FIG. 5 illustrates an embodiment of a fuel bundle with only an internal mixer.
Figure 6:
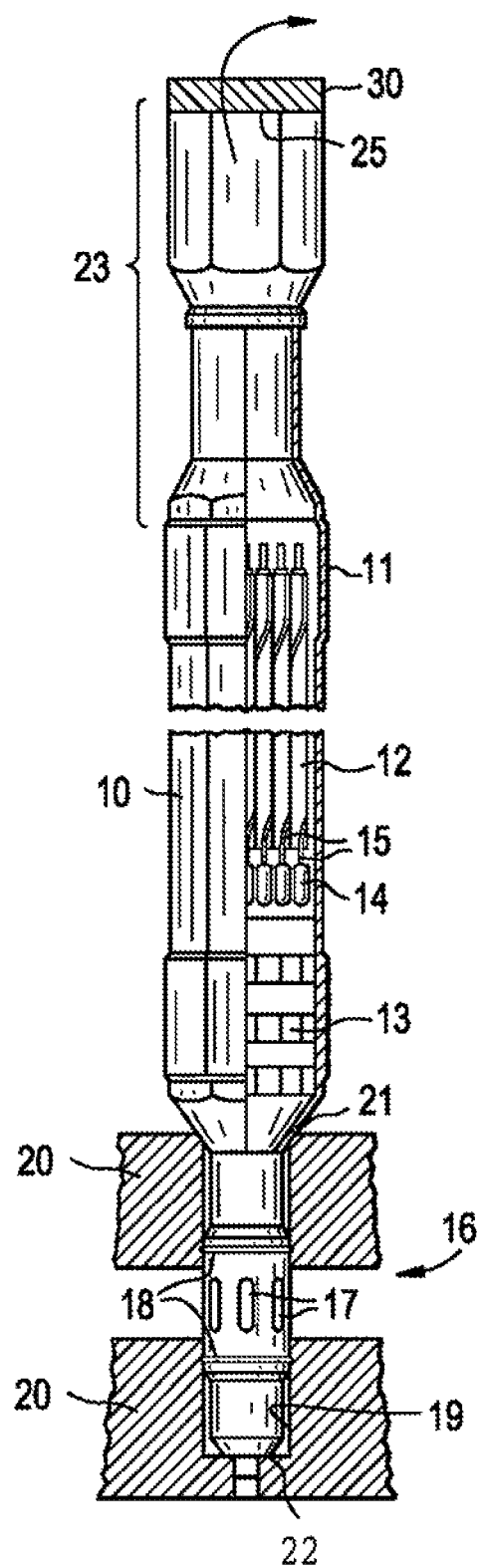
FIG. 6 illustrates an embodiment of a fuel bundle with only an external mixer.

According to example embodiments, a fuel bundle may include only the internal mixer 24 (FIG. 5), only the external mixer 30 (FIG. 6), or both the internal and external mixers 24 and 30 (FIG. 1).

The use of the mixers promotes sodium mixing after the liquid sodium exits the heated lengths of a fuel bundle in a sodium fast reactor. The mixing reduces thermal striping in the sodium. Thermal striping is a phenomenon in which the sodium develops hot and cold spots while it flows through the fuel bundle. This can happen even in bundles with a flat power distribution because of spiraling wire wraps, such as those that are used as spacers in the reactor. These wire wraps may cause the sodium to swirl in the bundle, and thermal gradients develop as a result of this swirling action. The mixers 24 and/or 30 installed on or in the fuel bundle force mixing of the sodium outflow, thereby reducing thermal gradients in the flow regime and reducing thermal striping. By reducing thermal striping, thermal stresses on the fuel bundle internal components are reduced, thereby extending the lifetime of the equipment. By utilizing channels or nozzles for mixing, the effect on turbulence of flow may be controlled.

The example embodiments may be applied to other fuel designs regardless of the shape of the channel, regardless of whether wire wraps are used, etc.

Example embodiments having thus been described, it will be obvious that the same may be varied in many ways. Such variations are not to be regarded as a departure from the intended spirit and scope of example embodiments, and all such modifications as would be obvious to one skilled in the art are intended to be included within the scope of the following claims.

What is claimed is:

1. A fuel bundle for a liquid metal cooled reactor, comprising:
    a housing defining a channel;
    a nose assembly secured to a lower end of the channel;
    a plurality of fuel rods disposed within the channel;
    an internal mixer disposed within the channel above the plurality of fuel rods, the internal mixer including peripheral flow control members and interior flow control members, the peripheral flow control members located near walls of the housing, the interior flow control members located towards a longitudinal center of the housing, at least one of the peripheral flow control members configured to re-direct a first portion of liquid metal flowing through the channel towards an interior of the channel, and at least one of the interior flow control members configured to re-direct a second portion of the liquid metal flowing through the channel away from the interior of the channel,
    wherein the internal mixer includes a support lattice configured to support and rigidly secure the interior flow control members,
    wherein a remaining portion of the liquid metal flowing through the channel, which is not the first portion of the liquid metal, and which is not the second portion of the liquid metal, is capable of substantially passing directly through the channel in a first longitudinal direction that is about parallel to a longitudinal length of the channel.

2. The fuel bundle of claim 1, wherein the support lattice is configured to support and rigidly secure the peripheral flow control members.

3. The fuel bundle of claim 1, wherein the support lattice is connected to the housing.

4. The fuel bundle of claim 1, wherein at least one of the interior flow control members is one of a tube, a vane and a nozzle.

5. The fuel bundle of claim 1, wherein at least one of the peripheral flow control members is one of a tube, a vane and a nozzle.

6. The fuel bundle of claim 1, further comprising:
    an exterior mixer disposed on a top end of the fuel bundle where the liquid metal flowing through the fuel bundle exits, the exterior mixer including external flow control members, at least one of the external flow control members configured to re-direct a first portion of the liquid metal exiting the fuel bundle away from the fuel bundle, the top end of the fuel bundle being above the plurality of the fuel rods.

7. The fuel bundle of claim 6, wherein the external mixer includes a support lattice configured to support and rigidly secure the external flow control members, wherein a remaining portion of the liquid metal exiting the fuel bundle, which is not the first portion of the liquid metal exiting the fuel bundle, is capable of substantially passing directly through the external mixer in the first longitudinal direction.

8. The fuel bundle of claim 7, wherein the support lattice is connected to the housing.

9. The fuel bundle of claim 6, wherein at least one of the exterior flow control members is one of a tube, a vane and a nozzle.

10. The fuel bundle of claim 1, further comprising:
    an exterior mixer disposed on a top end of the fuel bundle where the liquid metal flowing through the fuel bundle exits, the exterior mixer including external flow control members, at least one of the external flow control members configured to re-direct a first portion of the liquid metal exiting the fuel bundle towards a space above another fuel bundle, wherein a remaining portion of the liquid metal exiting the fuel bundle, which is not the first portion of the liquid metal exiting the fuel bundle, is capable of substantially passing directly through the external mixer in the first longitudinal direction, the top end of the fuel bundle being above the plurality of the fuel rods.

11. A fuel bundle for a liquid metal cooled reactor, comprising:
    a housing defining a channel;
    a nose assembly secured to a lower end of the channel;
    a plurality of fuel rods disposed within the channel;
    an exterior mixer disposed on a top end of the fuel bundle where the liquid metal flowing through the fuel bundle exits, the exterior mixer including external flow control members, at least one of the external flow control members configured to re-direct a first portion of liquid metal exiting the fuel bundle away from the fuel bundle, the top end of the fuel bundle being above the plurality of the fuel rods,
    wherein the external mixer includes a support lattice configured to support and rigidly secure the external flow control members,
    wherein a remaining portion of the liquid metal exiting the fuel bundle, which is not the first portion of the liquid metal exiting the fuel bundle, is capable of substantially passing directly through the external mixer in a first longitudinal direction that is about parallel to a longitudinal length of the channel.

12. The fuel bundle of claim 11, wherein the support lattice is connected to the housing.

13. The fuel bundle of claim 11, wherein at least one of the exterior flow control members is one of a tube, a vane and a nozzle.

14. The fuel bundle of claim 1, wherein the at least one peripheral flow control members is configured to re-direct the first portion of the liquid metal flowing through the channel towards the interior of the channel by being angled towards the longitudinal center of the housing, the at least one interior flow control member configured to re-direct the second portion of the liquid metal flowing through the channel away from the interior of the channel by being angled away from the longitudinal center of the housing.

15. The fuel bundle of claim 11, wherein the at least one external flow control member being configured to re-direct the first portion of the liquid metal exiting the fuel bundle away from the fuel bundle by being angled away from a longitudinal center of the housing.

16. A fuel bundle for a liquid metal cooled reactor, comprising:
a housing defining a channel;
a nose assembly secured to a lower end of the channel;
a plurality of fuel rods disposed within the channel;
an internal mixer disposed within the channel above the plurality of fuel rods, the internal mixer including peripheral flow control members and interior flow control members, the peripheral flow control members located near walls of the housing, the interior flow control members located towards a longitudinal center of the housing, at least one of the peripheral flow control members configured to re-direct liquid metal flowing through the channel towards an interior of the channel, and at least one of the interior flow control members configured to re-direct liquid metal flowing through the channel away from the interior of the channel,
wherein the internal mixer includes a support lattice configured to support and rigidly secure the interior flow control members.

17. A fuel bundle for a liquid metal cooled reactor, comprising:
a housing defining a channel;
a nose assembly secured to a lower end of the channel;
a plurality of fuel rods disposed within the channel;
an exterior mixer disposed on a top end of the fuel bundle where the liquid metal flowing through the fuel bundle exits, the exterior mixer including external flow control members, at least one of the external flow control members configured to re-direct the liquid metal exiting the fuel bundle away from the fuel bundle, the top end of the fuel bundle being above the plurality of the fuel rods,
wherein the external mixer includes a support lattice configured to support and rigidly secure the external flow control members.

* * * * *